Patented Dec. 4, 1951

UNITED STATES PATENT OFFICE 2,577,388

MANUFACTURE OF TETRACHLOROETHYLENE

Glenn W. Warren, Midland, Mich., assignor to The Dow Chemical Company, Midland, Mich., a corporation of Delaware No Drawing. Application January 22, 1945,
Serial No. 574,035

6 Claims. (Cl. 260—654)

This invention concerns an improved method for the chlorination of aliphatic compounds having the general formula:

$$C_nHX_{n'}Y_{n''}$$

wherein X and Y each represents hydrogen or chlorine, $n$ is an integer of from 2 to 3, inclusive, and $n'$ and $n''$ are integers having a sum corresponding to one of the values $2n-1$ and $2n+1$, which improved method permits ready control of the chlorination reaction so as to produce tetrachloroethylene in good yield while at the same time suppressing formation of carbon tetrachloride and avoiding excessive formation of by-products such as partially chlorinated hydrocarbons, hexachloroethane, and particularly hexachlorobenzene.

It is known that tetrachloroethylene may be formed, together with other products such as carbon tetrachloride, hexachloroethane, hexachlorobenzene and, frequently, incompletely chlorinated hydrocarbons by reacting an aliphatic compound such as ethylene chloride, propylene chloride, or propane, etc., with sufficient chlorine for complete chlorination of the same, the reaction being carried out in the presence of agents such as fused metal chlorides or porous granular solids, e. g. coke, charcoal, or pumice, etc., which agents have been indicated to be catalysts for the perchlorination reaction. The equations heretofore given for the reactions to form tetrachloroethylene by the perchlorination of the respective compounds, ethylene chloride, propylene chloride and propane are:

(1)     $C_2H_4Cl_2 + 3Cl_2 \rightarrow C_2Cl_4 + 4HCl$
(2)     $C_3H_6Cl_2 + 6Cl_2 \rightarrow C_2Cl_4 + CCl_4 + 6HCl$
(3)     $C_3H_8 + 8Cl_2 \rightarrow C_2Cl_4 + CCl_4 + 8HCl$ Because of the by-products which are formed in large amount in such known perchlorination processes, the yield of tetrachloroethylene, based on the carbon content of the compound subjected to chlorination, is undesirably low. Also, separation of the tetrachloroethylene is troublesome because of the considerable amount of hexachlorobenzene which is normally present in the mixture of organic products. During fractional distillation of the products, the hexachlorobenzene tends to separate in solid form and accumulate in the distilling system. It thereby reduces the efficiency of the distillation and frequently causes plugging of the vapor-cooling unit. Periodic shutdowns in order to remove the solid deposits of hexachlorobenzene have been necessary.

In my copending application, Serial No. 512,-605, filed December 2, 1943, now abandoned, of which this is a continuation-in-part, I have shown that in the perchlorination of propylene chloride the introduction of carbon tetrachloride, together with the chlorine and propylene chloride ordinarily employed as starting materials, has the effect of suppressing the formation of carbon tetrachloride and of increasing greatly the yield of tetrachloroethylene. It will be noted that this result is contrary to what would be expected on a basis of the above Equation 2, i. e. if the equation were considered as representing a non-reversible reaction, the introduction of a reaction product should not influence the relative rates of formation of the several products and, if the equation were considered as representing a reversible reaction, the introduction in the feed mixture of either product should, according to the law of mass action, suppress the formation of all of the products. It appears that the Equation 2, heretofore believed to represent the reaction, merely expresses the results obtained in past practice and that the perchlorination system probably involves a multiplicity of concurrent reactions with an as yet unknown condition of equilibrium between two or more of the reactions.

In the copending application, Serial No. 512,-605, it is also disclosed that the so-called "catalysts" heretofore employed in the perchlorination reaction are not required and that propylene chloride may advantageously be perchlorinated to produce tetrachloroethylene by passing a vapor mixture of the same together with chlorine and carbon tetrachloride through an open reaction chamber within which the mixture is ignited, i. e. heated to a reaction temperature. The perchlorination reaction is highly exothermic so that once started it may be continued without external heating.

I have extended my investigation and have found that the method of making tetrachloroethylene by perchlorinating propylene chloride in the presence of initially added carbon tetrachloride, as taught in my copending application, Serial No. 512,605, is directly applicable with regard to the perchlorination of any aliphatic compound having the general formula, $$C_nHX_{n'}Y_{n''}$$

wherein the symbols X, Y, $n$, $n'$ and $n''$ have the meanings hereinbefore given and that in all such instances the yield of tetrachloroethylene may be improved by introducing carbon tetrachloride in the feed mixture. Since carbon tetrachloride is a normal product of the perchlorination reaction, it is sufficient, for the production of tetrachloroethylene, that carbon tetrachloride be recycled in the process. Accordingly, this invention provides a method whereby tetrachloroethylene may be produced in exceptionally high yield and with relatively little, or no, formation of carbon tetrachloride.

It should be mentioned that the carbon tetrachloride thus introduced in the feed mixture serves as a diluent and a heat absorbant and aids materially in control of the reaction temperature. Other gaseous or vaporized diluents such as hydrogen chloride or hexachloroethane may be employed to aid in control of the temperature. The temperature control action of the diluent may be supplemented by external cooling or heating of the reaction mixture as necessary in order to maintain a desired reaction temperature.

I have still further found that the amount of hexachlorobenzene formed in the reaction varies with changes in the reaction temperature and the proportion of chlorine employed in the feed mixture. In general, a rise in the reaction temperature causes an increase in the formation of hexachlorobenzene. On the other hand, an increase in the proportion of chlorine over that theoretically required to convert the organic starting materials to the desired carbon chloride product tends to suppress the formation of hexachlorobenzene but to increase the formation of carbon tetrachloride. If desired, this latter tendency, i. e. toward increased formation of carbon tetrachloride, may be compensated by the introduction of carbon tetrachloride in the feed mixture.

There is another factor that appears to influence the formation of hexachlorobenzene. The perchlorination reaction is of the "flame" type in the sense that it is a highly exothermic reaction which tends to occur in a fairly well defined zone that is hotter than the surrounding zones and is somewhat analogous to a flame. The analogy just drawn is not intended to imply that light need be emitted by the reaction. Just as a portion of the feed to an ordinary gas flame may sometimes flow around, rather than into, the flame and thus be imperfectly consumed, a portion of the vapor feed to the perchlorination reaction may sometimes tend to flow around, rather than through, the zone of principal reaction, i. e. the reaction "flame," and be incompletely chlorinated. This usually results in an increase in the formation of hexachlorobenezene and sometimes also results in the production of partially chlorinated hydrocarbons. By observing usual precautions, e. g. in the construction and operation of the reactor, so as to direct the inflowing vapors as completely as possible into the reaction flame, the formation of hexachlorobenzene may be curtailed.

The amount of hexachlorobenzene formed is dependent upon a condition of balance between the several factors just mentioned. For instance, by operating so as to direct nearly all of the gas into the reaction flame and by using an excess of chlorine in the feed mixture the reaction may be carried out at high temperatures, e. g. from 700° to 900° C. or higher, without forming hexachlorobenzene in an excessive amount such as to cause plugging of the distilling system during separation of the products, or by employing a lower reaction temperature and directing the vapor feed into the reaction flame the formation of hexachlorobenzene may be restricted without using an excess of chlorine.

As indicated above, the feed mixture employed in the process comprises chlorine, an aliphatic compound having the aforementioned general formula, $C_nHX_{n'}Y_{n''}$, and carbon tetrachloride. The carbon tetrachloride introduced in the feed mixture may be employed in any proportion, but its action in suppressing further formation of the same and in enhancing the yield of tetrachloroethylene is dependent in part on the porportion in which it is used. Under otherwise similar conditions, an increase in the proportion of the carbon tetrachloride in the feed mixture from 0.1 molecular equivalent to between 1 and 3 molecular equivalents thereof per mole of the aliphatic compound to be perchlorinated results in a marked increase in the yield of tetrachloroethylene. The minimum proportion of the carbon tetrachloride in the feed mixture required in order to obtain a maximum yield of tetrachloroethylene varies somewhat, depending upon the identity of the aliphatic compound being perchlorinated, the proportion of chlorine in the feed mixture, and the reaction temperature, etc., but is usually in the order of between 1 and 3 molecular equivalents of the initially added carbon tetrachloride per mole of the aliphatic compound subjected to perchlorination. A further increase in the proportion of the carbon tetrachloride in the feed mixture usually results in little, if any, further increase in the yield of tetrachloroethylene. A large increase in the proportion of the carbon tetrachloride in the feed mixture over the minimum amount required to obtain the optimum yield of tetrachloroethylene sometimes causes a lowering of the yield, below the maximum obtainable, unless heat is supplied from an outside source in order to maintain a sufficiently high reaction temperature, e. g. a temperature of 400° C. or higher and preferably above 500° C. Such decrease in yield of tetrachloroethylene and accompanying increase in yield of carbon tetrachloride, which sometimes results from a large increase in the proportion of carbon tetrachloride in the feed above the ratio of from 1 to 3 molecular equivalents thereof per mole of the aliphatic compound to be perchlorinated is attributed to the absorption of heat by the excess of carbon tetrachloride in the feed mixture and a resultant lowering of the reaction temperature. In practice, between 0.4 and 10, preferably between 0.5 and 3, molecular equivalents of carbon tetrachloride is employed in the feed mixture per mole of the aliphatic compound to be perchlorinated, but larger proportions, e. g. 15 molecular equivalents or more of the initially added carbon tetrachloride per mole of the aliphatic compound to be perchlorinated, may be employed when provision is made for maintaining an adequate reaction temperature.

The chlorine, including that chemically combined in the starting materials, is employed in amount at least as great as that theoretically required for complete conversion of the carbon content of the vaporized starting materials to tetrachloroethylene. It will be noted that the minimum proportion of chlorine just stated includes that chemically combined in the starting materials, e. g. it includes the chlorine content of the carbon tetra chloride and any chlorinated hydrocarbons in the feed mixture, and that the proportion of free chlorine may in some instances be less than would theoretictlly be required for complete conversion to tetrachloroethylene of the aliphatic compound which is to be perchlorinated. In practice, free chlorine is employed in amount corresponding to at least half of that theoretically required for conversion of the compound to be chlorinated into tetrachloroethylene.

The chlorine, including that chemically combined in the starting materials, is preferably employed in excess over the minimum proportion just stated, since the employment of excess chlorine aids in suppressing the formation of hexachlorobenzene. Usually the excess of chlorine over the above-stated minimum proportion corresponds to between 1 and 5 moles of free chlorine per mole of the aliphatic compound subjected to perchlorination. The chlorine may be used in far greater excess, e. g. as much as 12 moles of chlorine per mole of propylene chloride may be used in perchlorinating the latter.

Examples of aliphatic compounds having the aforementioned general formula, $C_nHX_{n'}Y_{n''}$, which may be perchlorinated by the present method are ethylene, ethane, ethyl chloride, ethylene chloride, trichloroethane, tetrachloroethane, pentachloroethane, propylene, propane, n-propyl chloride, i-propyl chloride, propylene chloride, trichloropropanes, tetrachloropropanes, pentachloropropanes, hexachloropentanes, heptachloropropanes, butylene, butane, and the chlorobutanes containing from 1 to 9 chlorine atoms in the molecule, amylene, pentane and the chloropentanes containing from 1 to 11 chlorine atoms in the molecule, etc. Chloroolefines containing from two to five carbon atoms in the molecule may also be used as starting materials, but such compounds are, of themselves, valuable products, and, except for their possible presence in materials recycled in the process, they seldom are used for the production of tetrachloroethylene. In practice, compounds having the above general formula $C_nHX_{n'}Y_{n''}$ and containing two or three carbon atoms in the molecule are preferred as starting materials in producing carbon chlorides by the present process.

A gaseous mixture of the above-mentioned starting materials in the proportions just stated is fed in continuous flow into a reaction chamber where it is heated to a reaction temperature of from 500° to 900° C., and preferably between 500° and 800° C. Once the reaction is started it may usually be continued without further supply of heat from an outside source, in which case heat generated by the reaction is relied upon to maintain the reaction temperature. In some instances, it is desirable that the reaction chamber be externally cooled, e. g. with water or steam, etc., so as to avoid the development of an excessively high reaction temperature with resultant carbonization of the materials under treatment. The rate of vapor feed is such as to sustain the reaction "flame" and maintain it within the reactor. The reaction is preferably carried out in an unpacked reaction chamber, but it may, if desired, be accomplished by passage of the reaction mixture into a bath of fused metal chlorides or into a chamber which is packed with a granular material such as coke, charcoal, or pumice, etc. The presence of such contact materials in the reaction zone sometimes aids in obtaining substantially uniform heating of all portions of the reaction vapors. However, when using a carbon chloride or other diluent in the feed mixture sufficiently uniform heating may be obtained in an open reaction chamber without the aid of such contact materials.

The vapors flowing from the reaction chamber are cooled to condense the organic products and the latter are separated, e. g. by fractional distillation. The carbon tetrachloride which is obtained may advantageously be admixed with fresh quantities of chlorine and the aliphatic compound to be perchlorinated and be returned to the reaction. Thus, in the production of tetrachloroethylene, the tetrachloroethylene may be separated from the other carbon chloride products and the latter, particularly the carbon tetrachloride, may be recycled in the process. The minor amount of hexachloroethane normally formed in the reaction may, if desired, be recycled together with the carbon tetrachloride. The method permits the continuous chlorination of any of the hereinbefore-mentioned aliphatic hydrocarbons or chlorohydrocarbons to produce tetrachloroethylene in higher yield and with less by-product formation than has heretofore been possible.

The following examples describe a number of ways in which the principle of the invention has been applied, but are not to be construed as limiting the invention.

EXAMPLE 1

A vapor mixture of one molecular equivalent of propylene chloride, 4.67 molecular equivalents of chlorine, and 0.586 molecular equivalent of carbon tetrachloride was passed in steady flow into an open reaction chamber, wherein it was ignited and heated to a temperature of about 800° C., largely by heat generated in the reaction. The vapor mixture flowing from the reaction chamber was cooled to condense the carbon chloride products and the latter were separated by fractional distillation. There were obtained, as products formed in the reaction, 0.126 molecular equivalent of carbon tetrachloride, 1.342 molecular equivalents of tetrachloroethylene, and a minor amount of other carbon chlorides. The yield of carbon tetrachloride just stated was obtained by subtracting, from the amount of carbon tetrachloride found in the reacted mixture, the amount of carbon tetrachloride present in the starting materials.

EXAMPLE 2

A vapor mixture of one molecular equivalent of propylene chloride, 4.68 moles of chlorine and 1.04 moles of carbon tetrachloride was fed into an open reaction chamber and caused to react at about 800° C., after which the carbon chloride products were condensed and separated as in Example 8. There were formed by the reaction 0.025 molecular equivalent of carbon tetrachloride and 1.38 moles of tetrachloroethylene per mole of the propylene chloride starting material.

EXAMPLE 3

In each of a series of experiments chlorine, propylene and carbon tetrachloride in the proportions stated in the following table were admixed and passed in turbulent flow into an open reaction chamber. The vapors were ignited by external heating, but thereafter external heating was discontinued and the reactor was cooled on the outside with water. The heat of reaction was sufficient to ignite the inflowing vapor mixture and cause continuance of the reaction. The temperature of the vapors flowing from the reaction chamber varied somewhat in the different experiments, but was generally in the range of from 500° to 800° C. The effluent vapors were cooled to condense the organic products. Carbon tetrachloride and tetrachloroethylene were recovered from the condensate by fractional distillation. The residue from the distillation consisted for the most part of hexachloroethane together with a minor amount of hexachlorobenzene. For the purpose of calculating the yields of carbon tetrachloride and tetrachloroethylene, the residue was regarded as being hexachloroethane. The table gives the molecular ratios of chlorine to propylene and of carbon tetrachloride to propylene in the feed mixture employed in each experiment. It also gives the per cent by weight of carbon tetrachloride, of tetrachloroethylene and of higher-boiling products (principally hexachloroethane) in the condensate obtained by cooling the vapors flowing from the reaction chamber. The table also states the proportions of carbon tetrachloride and of tetrachloroethylene in the reacted mixture in terms of the molecular equivalents of each per mole of propylene employed as a starting material.

tetrachloride entered into the reaction to form tetrachloroethylene.

EXAMPLE 4

In each of a series of experiments a vapor mixture of propane, chlorine and carbon tetrachloride in the molecular proportions given in Table II was passed into an open reaction chamber where it was heated to cause reaction. Once started, the reaction was self-sustaining, i. e.

Table I

| Run No. | Feed Mixture | | Reacted Mixture Contains— | | | | |
|---|---|---|---|---|---|---|---|
| | | | Composition of Org. Condensate | | | Moles of $CCl_4$ per Mole of $C_3H_6$ in Feed | Moles of $C_2Cl_4$ per Mole of $C_3H_6$ in Feed |
| | Mole Ratio of $CCl_4$/$C_3H_6$ | Mole Ratio of $Cl_2$/$C_3H_6$ | Per Cent $CCl_4$ | Per Cent $C_2Cl_4$ | Per Cent of Higher Boiling Products | | |
| 1 | 1.085 | 6.5 | 39.0 | 56.5 | 4.5 | 1.070 | 1.430 |
| 2 | 1.50 | 6.4 | 32.6 | 59.0 | 8.4 | 0.920 | 1.625 |
| 3 | 1.61 | 6.6 | 32.2 | 61.5 | 6.3 | 0.995 | 1.685 |
| 4 | 1.63 | 6.5 | 39.8 | 55.5 | 4.7 | 1.235 | 1.600 |
| 5 | 1.67 | 6.5 | 52.9 | 43.0 | 4.1 | 1.810 | 1.350 |
| 6 | 1.71 | 6.5 | 53.6 | 41.4 | 5.0 | 1.850 | 1.320 |
| 7 | 1.37 | 5.5 | 32.6 | 62.0 | 5.4 | 0.928 | 1.635 |
| 8 | 1.38 | 6.7 | 32.2 | 62.4 | 3.4 | 0.968 | 1.640 |
| 9 | 1.39 | 8.5 | 42.4 | 52.8 | 4.8 | 1.270 | 1.490 |

Runs 1–6 of Table I illustrate the results obtained by varying the proportions of carbon tetrachloride in the feed mixture. As the proportion of carbon tetrachloride in the feed was increased, the yield of tetrachloroethylene increased to a maximum value and thereafter decreased due, apparently, to a lowering of the reaction temperature because of heat absorption by the carbon tetrachloride in excess of that resulting in the maximum yield. In these same runs, as the proportion of carbon tetrachloride in the feed was increased the proportion of carbon tetrachloride in the products at first decreased and thereafter increased. Runs 7–9 show the results obtained when the proportion of chlorine in the feed mixture was varied. An increase in the proportion of chlorine resulted in an increase in the yield of carbon tetrachloride and a decrease in the yield of tetrachloroethylene. This effect of an increase in the proportion of chlorine may be overcome by also increasing the proportion of carbon tetrachloride in the feed mixture and, if necessary, supplying, or retaining, an increased amount of heat in the reacting mixture so as to avoid an excessive lowering of the reaction temperature due to the increased amount of carbon tetrachloride in the feed. In each of the runs 2–4, 7, and 8 the yield of tetrachloroethylene is greater than could possibly be formed from the propylene alone and the molecular ratios of carbon tetrachloride to the propylene employed is less in the reaction products than in the feed mixture. These facts indicate that at least a portion of the carbon external heating was not required and, instead, the reactor was cooled on the outside to avoid overheating due to the heat of reaction. The organic products were condensed and separated as in the preceding examples. However, once such continuous mode of operation was under way, the introduction of carbon tetrachloride from an outside source was discontinued and, instead, a mixture of approximately 80 per cent by weight of carbon tetrachloride, 10 per cent hexachloroethane and 10 per cent tetrachloroethane was admixed with the feed of chlorine and propane flowing to the reaction chamber. The carbon tetrachloride and hexachloroethane thus introduced were materials which were being continuously separated from the reacted mixture and recycled in the process. The tetrachloroethane was introduced from a source outside of the reaction system. Thereafter, the data given in Table II was collected. The table gives the molecular ratios of carbon tetrachloride to propane and of chlorine to propane in the feed mixture. It also gives the per cent by weight of each of the compounds carbon tetrachloride, tetrachloroethylene, hexachloroethane and hexachlorobenzene in the mixture of products which was being condensed while recycling the carbon tetrachloride and hexachloroethane into admixture with the feed of chlorine, propane and tetrachloroethane. The table also gives the molecular equivalents of carbon tetrachloride and of tetrachloroethylene in the reacted mixture per mole of propane in the feed mixture.

Table II

| Run No. | Feed Mixture | | Reacted Mixture Contains— | | | | | |
|---|---|---|---|---|---|---|---|---|
| | Mole Ratio of $CCl_4$/$C_3H_8$ | Mole Ratio of $Cl_2$/$C_3H_8$ | Composition of Condensate | | | | Moles of $CCl_4$ per Mole of $C_3H_8$ in Feed | Moles of $C_2Cl_4$ per Mole of $C_3H_8$ in Feed |
| | | | Per Cent $CCl_4$ | Per Cent $C_2Cl_4$ | Per Cent $C_2Cl_6$ | Per Cent $C_6Cl_6$ | | |
| 1 | 1.68 | 11.0 | 39.6 | 50.3 | 5.0 | 5.1 | 1.296 | 1.520 |
| 2 | 2.14 | 9.5 | 32.0 | 61.0 | 5.0 | 2.0 | 1.152 | 2.031 |
| 3 | 2.72 | 11.0 | 51.6 | 42.5 | 5.9 | Nil | 2.400 | 1.825 |

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method for the production of tetrachloroethylene, the steps which consist in forming a mixture of an aliphatic compound having the general formula:

$$C_nHX_{n'}Y_{n''}$$

wherein X and Y each represent a member of the group consisting of hydrogen and chlorine, $n$ is an integer of from 2 to 3, and $n'$ and $n''$ are integers having a sum corresponding to one of the values $2n-1$ and $2n+1$, carbon tetrachloride in amount corresponding to at least 0.4 of the molecular equivalent of the aliphatic compound having said general formula, and sufficient chlorine to perchlorinate the aliphatic compound having said general formula and convert it to a tetrachloroethylene, passing the mixture through a reaction zone where it is heated in vapor phase to a reaction temperature between 500° and 800° C., cooling the vapors flowing from said zone to condense the organic products, separating tetrachloroethylene and carbon tetrachloride from the condensate, and returning carbon tetrachloride to the first of the foregoing steps.

2. In a method for the production of tetrachloroethylene, the steps which consist in forming a vapor mixture of propylene together with at least 0.4 of its molecular equivalent of carbon tetrachloride and chlorine in amount exceeding that theoretically required in order to convert the propylene into tetrachloroethylene, passing the mixture through a reaction zone wherein it is heated to a reaction temperature between 500° and 800° C., cooling the vapors flowing from said chamber to condense the organic products, separating tetrachloroethylene and carbon tetrachloride from the reaction products and returning carbon tetrachloride to the first of the foregoing steps.

3. In a method for the production of tetrachloroethylene, the steps which consist in forming a vapor mixture of propylene chloride, together with at least 0.4 of its molecular equivalent of carbon tetrachloride and chlorine in amount exceeding that theoretically required in order to convert the propylene chloride into tetrachloroethylene, passing the mixture through a reaction zone wherein it is heated to a reaction temperature between 500° and 800° C., cooling the vapors flowing from said chamber to condense the organic products, separating tetrachloroethylene and carbon tetrachloride from the reaction products and returning carbon tetrachloride to the first of the foregoing steps.

4. In a method wherein gaseous chlorine is reacted at temperatures between 500° and 800° C. with vapors of propylene chloride to form tetrachloroethylene, the step of adding to the reactants at least 0.2 molecular equivalent of carbon tetrachloride per mole of the propylene chloride.

5. In a method wherein gaseous chlorine is reacted at temperatures between 500° and 800° C. with vapors of propylene chloride to form tetrachloroethylene, the improvement which consists in employing, as starting materials for the reaction, a mixture of one molecular equivalent of propylene chloride, between 0.4 and 1 molecular equivalent of carbon tetrachloride, and between 4 and 6 molecular equivalents of chlorine.

6. In a continuous method wherein chlorine is reacted with propylene chloride to produce tetrachloroethylene, the steps of forming a vapor mixture comprising propylene chloride, chlorine, and carbon tetrachloride in the proportions of between 4 and 10 molecular equivalents of chlorine and at least 0.4 molecular equivalent of carbon tetrachloride per mole of the propylene chloride, passing the mixture through a reaction zone where it is heated to a reaction temperature above between 500° and 800° C., cooling the vapors flowing from said zone to condense the organic products, fractionally distilling the latter to separate tetrachloroethylene and carbon tetrachloride from one another, and returning recovered carbon tetrachloride to the first of the foregoing steps.

GLENN W. WARREN.

REFERENCES CITED

The following references are of record in the file of this patent:

UNITED STATES PATENTS

| Number | Name | Date |
| --- | --- | --- |
| 1,947,491 | Reilly | Feb. 20, 1934 |
| 2,034,292 | Grebe et al. | Mar. 17, 1936 |
| 2,160,574 | Hennig | May 30, 1939 |
| 2,178,622 | Basel et al. | Nov. 7, 1939 |
| 2,255,752 | Basel et al. | Sept. 16, 1941 |
| 2,308,903 | Wimmer | Jan. 19, 1943 |
| 2,442,323 | Davis et al. | May 25, 1948 |
| 2,442,324 | Heitz et al. | May 25, 1948 |

OTHER REFERENCES

McBee et al.: "Industrial and Engineering Chemistry," vol. 33, pages 176–185 (1941).